United States Patent [19]

Pass et al.

[11] Patent Number: 5,287,927
[45] Date of Patent: Feb. 22, 1994

[54] VAPOR RECOVERY APPARATUS AND METHOD

[75] Inventors: David A. Pass, 2301 Bayswater Dr., Kennesaw, Ga. 30144; Thomas A. Rice, Kennesaw, Ga.

[73] Assignee: David A. Pass, Kennesaw, Ga.

[21] Appl. No.: 974,140

[22] Filed: Nov. 10, 1992

[51] Int. Cl.⁵ ............................................. E21B 43/00
[52] U.S. Cl. .................................................... 166/267
[58] Field of Search .............. 166/265, 267, 75.1, 166/79

[56] References Cited

U.S. PATENT DOCUMENTS

| | | | |
|---|---|---|---|
| 4,593,760 | 6/1986 | Visser et al. | 166/267 |
| 4,597,437 | 7/1986 | McNabb | 166/75.1 X |
| 4,730,672 | 3/1988 | Payne | 166/266 |
| 4,886,119 | 12/1989 | Bernhardt et al. | 166/267 |
| 4,890,673 | 1/1990 | Payne | 166/266 |
| 4,895,085 | 1/1990 | Chips | 110/346 |
| 4,919,570 | 4/1990 | Payne | 405/128 |
| 4,982,788 | 1/1991 | Donnelly | 166/266 |
| 5,017,289 | 5/1991 | Ely et al. | 210/610 |
| 5,042,582 | 8/1991 | Rajewski | 166/75.1 X |
| 5,050,676 | 9/1991 | Hess et al. | 166/267 |
| 5,061,458 | 10/1991 | Miller | 422/173 |
| 5,076,360 | 12/1991 | Morrow | 166/267 |
| 5,104,525 | 4/1992 | Roderick | 210/87 |
| 5,111,883 | 5/1992 | Savery | 166/267 X |
| 5,116,515 | 5/1992 | Selesnick | 219/744 |
| 5,118,629 | 6/1992 | Quiros et al. | 436/55 |
| 5,149,344 | 9/1992 | Macy | 166/267X |

*Primary Examiner*—Thuy M. Bui
*Attorney, Agent, or Firm*—Hopkins & Thomas

[57] ABSTRACT

A mobile vapor recovery apparatus (10) efficiently removes materials from the vadose layer of earth soil. The apparatus (10) has a plurality of intake ports (14a-14d) each configured to releasably connect to a well pipe communicating gas having vaporized materials from a well in the soil. The intake ports (14a-14d) communicate the gas to a common manifold (24). A fluid collection tank (26) receives the gas from the manifold (24) and collects fluid entrained in the gas. A blower (32) draws the gas into the intake ports (14a-14d) by forcing the gas from the tank (26) and out of an exhaust port (34). A transportable support frame (12) is configured to support the plurality of intake ports (14a-14d), the fluid collection tank (26), and the blower (32) in a self-contained transportable unit. In addition, the mobile vapor recovery apparatus (10) may be mounted within a trailer unit (82) having a locking mechanism (102).

29 Claims, 4 Drawing Sheets

VAPOR RECOVERY APPARATUS AND METHOD

BACKGROUND OF THE INVENTION

1. Technical Field

The present invention relates to environmental remediation technology, and more particularly, to a self-contained mobile vapor recovery apparatus and method for removing volatile materials from soil.

2. Related Art

Soil and water contamination due to spillage of hazardous chemicals and pollutants has long posed a serious problem. For instance, underground gasoline tanks may leak and discharge gasoline or other hydrocarbons directly into the ground. As another example, industrial solvents used in industrial processes may be illegally discharged into waste water or sumps, or inadvertently discharged directly into the ground. In any case, these materials, typically volatile organic compounds (VOCs), may propagate great distances through the ground and even enter ground water aquifers, thus resulting in a devastating environmental impact.

There are several conventional removal techniques which have previously been used in the art to remove volatile materials from the vadose earth layer. The vadose earth layer is the soil region just above the water table of the earth to the earth surface. The most common of these removal techniques is excavation in which all of the contaminated soil is physically removed and eventually replaced with fresh soil. While excavation is a relatively simple process, excavation is not practical when large volumes are involved due to prohibitive cost and time factors.

Another more sophisticated removal technique involves a circulation system for leaching volatile materials from the vadose earth layer into the water table, where the materials are recovered by a water removal well and pump system. The foregoing process is described generally in U.S. Pat. No. 4,167,973 to Forte et al. as well as many other patents, the Forte disclosure of which is incorporated herein by reference. Such processes are not always successful due to low water solubility of most common industrial pollutants, which results in lengthy and often costly recovery Various vacuum removal techniques have also been used to extract volatile hazardous materials from the vadose earth layer. Vacuum removal techniques are often favored because they are less intrusive and destructive of the contaminated soil region to be cleaned up and, moreover, the volatile materials are retrieved in the form of material vapor within air, which is much more easily disposed of than materials contained within water or some other fluid. Conventional vacuum removal techniques are described in U.S. Pat. No. 5,116,515 to Selesnick, U.S. Pat. No. 5,111,883 to Savery, U.S. Pat. No. 5,050,676 to Hess et al., U.S. Pat. No. 5,076,360 to Morrow, U.S. Pat. No. 4,982,788 to Donnelly, U.S. Pat. No. 4,895,085 to Chips, U.S. Pat. No. 4,890,673 to Payne, U.S. Pat. No. 4,886,119 to Bernhardt et al., U.S. Pat. No. 4,730,672 to Payne, and U.S. Pat. No. 4,593,760 to Visser et al., all of the disclosures of which are incorporated herein by reference as if set forth in full hereinbelow.

Generally, the vacuum removal techniques involve situating one or more vertical withdrawal wells in the contaminated field. Each withdrawal well includes an elongated vertical borehole, into which there is placed a riser pipe. The riser pipe has numerous screened perforations or openings throughout its length and around its perimeter. Materials are vaporized and urged towards the vertical withdrawal well, through the screened openings, and upwardly toward the well head at the earth surface by generating a vacuum within the vertical withdrawal well. For this purpose, vacuum withdrawal equipment including a blower or other suction apparatus(es) is often situated at the earth surface near the well head. As materials are vaporized and pulled to the earth surface, the vaporized materials are collected and perhaps processed for disposal.

When materials are removed from the ground using vacuum removal techniques, air containing the material vapors is often discharged directly into the atmosphere, or discharged into the air after passing them through a catalytic converter. Federal, state, and local environmental pollution regulations place a limit on the amount of air pollutants which may be discharged in this manner. For example, a typical limit is 3.5 pounds (1.6 kilograms) per hour for volatile organic compounds. If a deep well is drilled, it is not uncommon for one withdrawal well alone to produce 2.5 pounds of solvent per hour discharged into the air.

The vacuum withdrawal equipment situated near the well head(s) is designed to remain in place for several years, because this length of time is usually needed to remove undesirable materials via the various vacuum removal techniques. Therefore, the vacuum withdrawal equipment is generally physically and permanently attached to the earth surface near the well head(s) and is protected in some manner from theft and/or adverse tampering. The vacuum equipment may include, for instance, a temperature gauge, a vacuum gauge, a flow measurement port, and/or a sample port. In this regard, see U.S. Pat. No. 5,017,289 to Ely, U.S. Pat. No. 4,890,673 to Payne, and U.S. Pat. No. 4,730,672 to Payne. Further, in many cases, the withdrawal wells are provided near the earth surface with a surrounding cement collar and a protective lid or cap, as illustrated in U.S. Pat. No. 5,076,360 to Morrow, U.S. Pat. No. 5,017,289 to Ely et al., and U.S. Pat. No. 5,050,676 to Hess et al. for security and safety reasons. The lid or cap is often locked.

A contaminated field may be provided with a plurality of withdrawal wells for removing unwanted materials because a plurality can tremendously accelerate the clean-up process. In this case, the withdrawal wells are usually channelled to a common manifold which leads to a single port for connection to a single blower or suction apparatus. Such a manifold arrangement is shown and described in, for example, U.S. Pat. No. 5,116,515 to Selesnick, 4,982,788 to Donnelly, and U.S. Pat. No. 4,895,085 to Chips (however, vapor and water extraction). A control unit is generally disposed for controlling suction in the common manifold and wells, material disposal, and/or other material processing systems.

The withdrawal wells are individually monitored by traveling to each well head in the contaminated field to observe the vacuum gauge and the sample port situated at each well head. Upon acquiring the foregoing data from the well heads, certain wells can be capped, while certain others are opened or are left open, so as to optimize material removal while abiding by the applicable environmental pollution regulations. In other words, it may be impermissible to draw from multiple wells to increase the speed at which the unwanted materials are removed from the soil because permissible environmental ambient air quality limitations would be exceeded. Accordingly, it is important to be able to monitor the quantity of vaporized materials being drawn from each well and its associated zone in the field.

Although successful to some extent, the conventional apparatuses and methodologies developed thus far for implementing vacuum removal techniques, especially with multiple withdrawal wells, are problematic and do not meet the present needs of the industry. First, the permanent installation of vacuum withdrawal equipment at a contaminated field poses many problems. The equipment generally involves piece-meal construction and cannot be easily installed. The equipment cannot be easily removed and moved after soil has been decontaminated or cleansed Moreover, the equipment is often damaged during removal, and the procedure is generally labor intensive. In addition, while the equipment is in operation, it is difficult and labor intensive to monitor the various zones of the contaminated field so as to efficiently dispense of the volatized materials while abiding by the applicable federal, state, and local environmental pollution regulations.

SUMMARY OF THE INVENTION

An object of the present invention is to overcome the deficiencies and inadequacies of the prior art as described above.

Another object of the present invention is to provide a mobile vapor recovery apparatus and method for removing materials from soil.

Another object of the present invention is to provide a mobile vapor recovery apparatus which is inexpensive to manufacture, which is durable in structure, and which is efficient as well as reliable in operation.

Another object of the present invention is to provide a vapor recovery apparatus which is user friendly in that it can be easily installed, transported, and removed with minimal cost and labor.

Broadly stated, the present invention is a mobile vapor recovery apparatus for efficiently removing volatile materials from soil. The apparatus comprises an intake port means for releasably connecting to and receiving gas from a well pipe leading to a well in the soil. The gas has vaporized materials from the soil. A fluid collection tank is configured to receive the gas from the intake port means. The tank collects fluid entrained in the gas. A blower means draws the gas into the intake port means by forcing the gas from the tank and out of an exhaust port. A transportable support frame secures the intake port means, the fluid collection tank, and the blower means in a self-contained unit. As a result, the vapor recovery apparatus can be easily transported, installed, and removed at little expense and with minimal labor. Moreover, various wells and/or zones of the contaminated field can be individually monitored so as to efficiently dispense of the materials while abiding by the applicable federal, state, and local environmental pollution regulations.

The present invention can also be viewed as a novel method for efficiently removing materials from soil. In this sense, the present invention involves the following method steps. One step is to secure an intake port means, a fluid collection tank, and a blower means to a transportable support frame to derive a self-contained mobile unit. Another step is to dispose quick-connect means on the intake port means for releasably connecting and disconnecting the intake port means of the unit and a well pipe means. The well pipe means communicates gas having vaporized materials from a well in the soil. Another step is to configure the fluid collection tank to receive gas from the intake port means so that the tank can collect fluid entrained in the gas. Finally, another step is to dispose the blower means to draw the gas into the intake port means by forcing the gas from the tank and out of an exhaust port.

Another advantage of the present invention is that it provides a mobile vapor recovery apparatus having a transportable support frame for mounting all of the various components of the vacuum withdrawal equipment, thereby deriving a self-contained mobile unit.

Another advantage of the present invention is that it provides a vapor recovery apparatus which comprises a plurality of intake ports that permits individual well and zone control as well as sampling.

Another advantage of the present invention is that it provides a vapor recovery apparatus having quick-connect fittings (1) for quickly engaging and disengaging the apparatus and the contaminated soil and (2) for quickly engaging and disengaging the apparatus and any appropriate exhaust treatment system, for example but not limited to, systems implementing incineration, carbon adsorption, bioremediation, or oxidation.

Another advantage of the present invention is that it provides are very convenient means for extracting materials from soil formations residing on or near the surface of the ground or elsewhere. Examples of soil formations include a mere soil pile, a landfill, or ground soil surrounding the sight of an accidentally overturned tanker truck which has spilled contaminants. Horizontal wells can be positioned through the soil formation and easily connected to the transportable vapor recovery apparatus, which can be moved from location to location, if necessary.

Another advantage of the present invention is that it provides a vapor recovery apparatus having a means for regulating the total vacuum suction as well as pollution exhaust so as to accommodate federal, state, and local environmental regulations during the vacuum withdrawal process.

Another advantage of the present invention is that it provides a vapor recovery apparatus which comprises a fluid collection tank which can be automatically emptied once full of contaminated liquid.

Another advantage of the present invention is that it provides a vapor recovery apparatus which emphasizes removal of vapors, not fluids, from the soil, thereby promoting efficiency of material removal and thereby easing the burden of material disposal (i.e., regulations are more strict relative to disposing of fluids).

Another advantage of the present invention is that it provides a vapor recovery apparatus and method for removing any chemicals that have a vapor phase from soil. These materials include, for example but not limited to, hydrocarbons, gasoline, methane, radon, sulfuric acid ($H_2SO_4$), and hydrogen sulfide ($H_2S$). It should be noted that the retrieved materials, particularly methane, may be utilized as an energy source after retrieval from the soil.

Other objects, features, and advantages of the present invention will become apparent from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
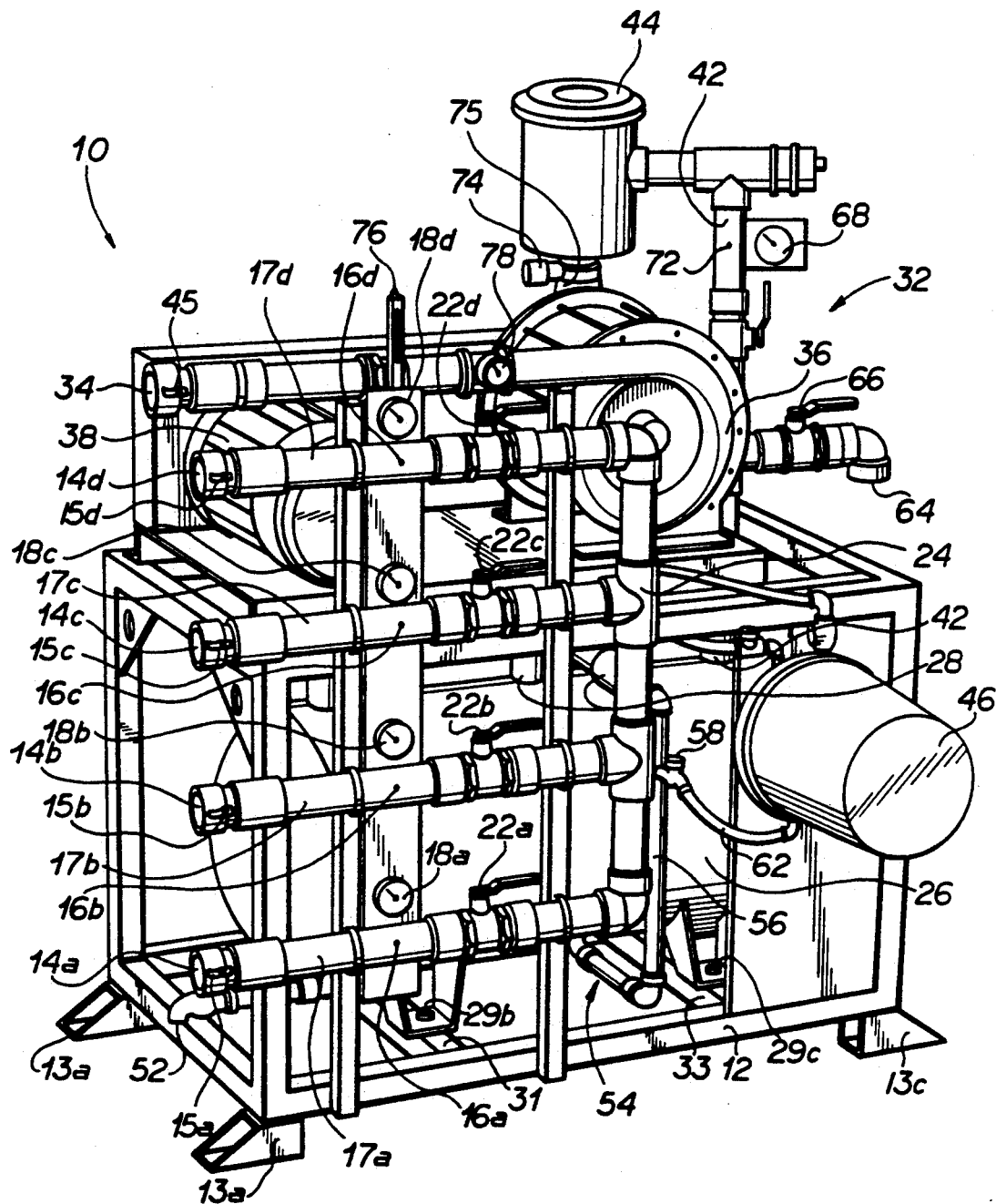
FIG. 1 is a front perspective view of a mobile vapor recovery apparatus in accordance with the present invention.
Figure 2:
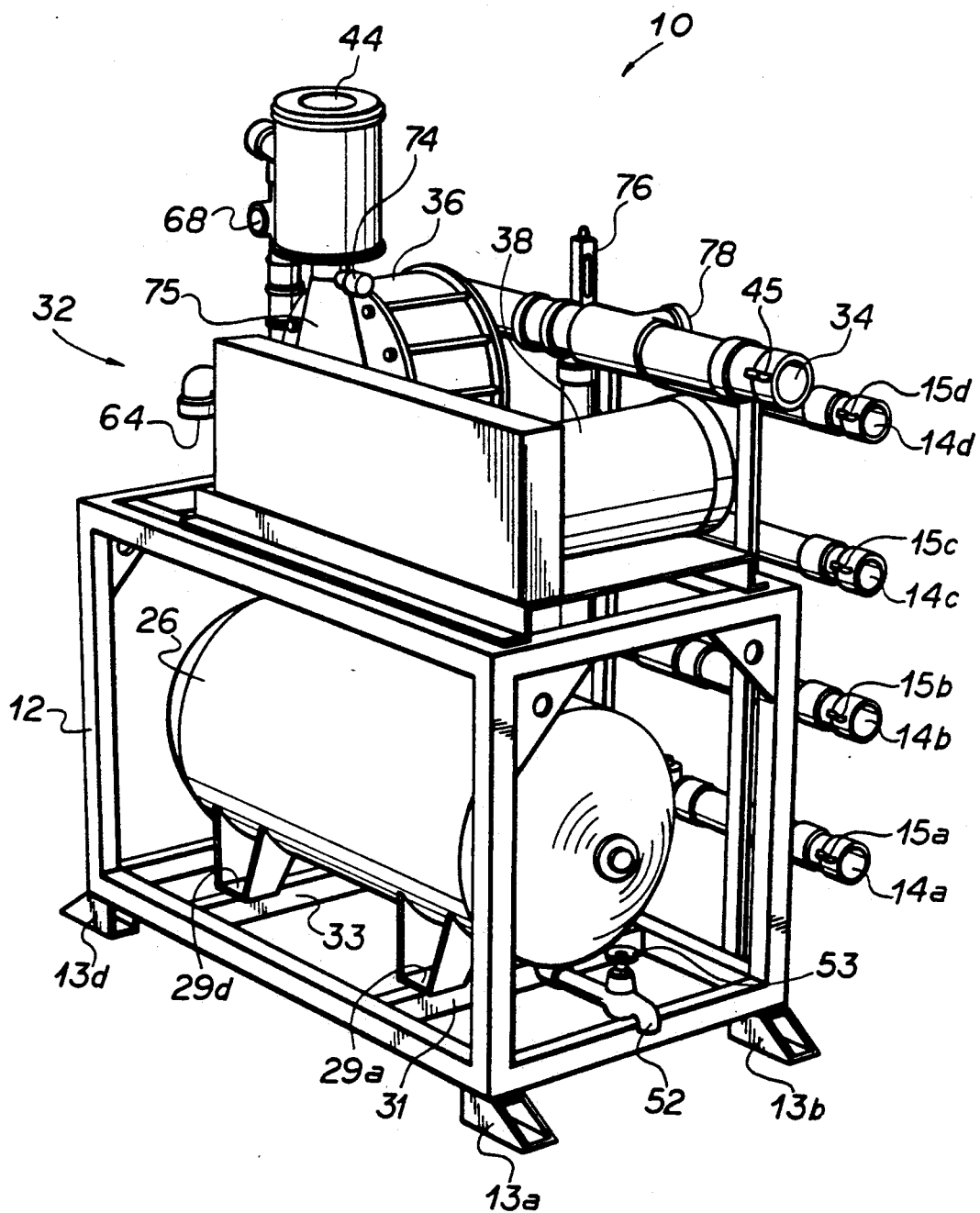
FIG. 2 is a rear perspective view of the mobile vapor recovery apparatus of FIG. 1.

With reference to the drawings wherein like reference numerals represent corresponding parts throughout the several views, FIGS. 1 and 2 illustrate perspective views of a self-contained mobile vapor recovery apparatus 10 in accordance with the present invention. The mobile vapor recovery apparatus 10 is configured to efficiently remove many different types of materials from soil using a vacuum withdrawal technique. The mobile vapor recovery apparatus 10 can remove soil materials from the vadose layer of the earth and also materials which float on the earth water table, generally known in the art as "free phase materials." Further, the vapor recovery apparatus 10 can be used for conveniently extracting materials from soil formations residing on or near the surface of the earth or elsewhere. Examples of such soil formations include a mere soil pile, a landfill, or ground soil surrounding the sight of an accidentally overturned tanker truck which has spilled contaminants. In this regard, horizontal and/or vertical wells can be positioned in the soil formation and easily connected to the transportable vapor recovery apparatus, which can be moved from location to location, if necessary.

With respect to the materials removed from soil, the mobile vapor recovery apparatus 10 can remove, for example but not limited to, hydrocarbons, gasoline, methane, radon, sulfuric acid ($H_2SO_4$), and hydrogen sulfide ($H_2S$). It should be noted that the removed materials, and particularly methane, may be utilized as an energy source or used for some other useful purpose after retrieval from the soil.

As illustrated in FIGS. 1 and 2, the vapor recovery apparatus 10 has a rectangular shaped, sturdy, transportable support frame 12 having support frame feet 13a–13d, as illustrated in FIGS. 1 and 2, for facilitating mobility. The vacuum withdrawal equipment is mounted to the transportable support frame 12 so as to form a self-contained unit which is easily transported, installed, and removed. The vapor recovery apparatus 10 may be easily lifted via a forklift or small crane and placed into a truck or tailor, as examples. The four support frame feet 13a–13d of the transportable support frame 12 enable it to securely stand alone on any flat surface and, if desired, be affixed via bolts to the same. Furthermore, the transportable support frame 12 can be manufactured from any material, such as steel or aluminum, suitable for supporting the vacuum withdrawal equipment.

Now describing the on-board vacuum withdrawal equipment, the vapor recovery apparatus 10 has a plurality of intake ports 14a–14d configured to releasably connect to a well pipe means (not shown). The well pipe means communicates gas having vaporized materials from one or more wells in the contaminated soil. Preferably, each of the intake ports 14a–14d is coupled to a well pipe means in the form of one or more flexible hoses, each hose leading to one or more wells. The flexible hoses are coupled to the intake ports 14a–14d via a respective cam and groove quick-connect coupling 15a–15d, which are well known in the art. It should be noted that there can be any number of intake ports 14a–14d depending upon the needs of the user, the power specifications of the vacuum withdrawal equipment disposed on the vapor recovery apparatus 10, and the applicable federal, state, and local environmental regulations. Further, it should be understood that any type of conventional coupling may be utilized to connect the intake ports 14a–14d to the respective pipes of the well pipe means.

The vapor recovery apparatus 10 has a plurality of sample ports 16a–16d corresponding with each of the intake ports 14a–14d, respectively, as illustrated in FIG. 1. The sample ports 16a–16d are situated in respective intake port pipes 17a–17d, which are located in a parallel arrangement along the side of the apparatus 10. The intake port pipes 17a–17d as well as the other components of the pipe network of the apparatus 10 are preferably a light weight plastic or aluminum, but obviously could be comprised of other suitable materials such as stainless or galvanized steel. In essence, the sample ports 16a–16d are configured to permit extraction of small quantity samples of the gas drawn through each of the intake ports 14a–14d so that the gas can be chemically analyzed. Analysis is helpful in determining the quality of emissions and aids the user in controlling the amount of gas drawn from each zone and/or from each well in a contaminated field so as to optimize the performance of the vapor recovery apparatus 10, while abiding by applicable environmental regulations. In the preferred embodiment, the sample ports 16a–16d septum type devices which are manufactured by and are commercially available from Swagelock Company, Solon, Ohio, U.S.A.

Vacuum gauges 18a–18d are disposed on each of the intake port pipes 17a–17d, respectively, so that the gas pressure of gas drawn into each of the intake ports 14a–14d can be individually monitored. Furthermore, gate valves 22a–22d are disposed on each of the intake ports 14a–14d for individually regulating the flow rate of gas entering each of the intake ports 14a–14d and flowing through the intake port pipes 17a–17d.

The intake port pipes 17a–17d communicate the incoming gas to a common manifold 24, which is transversely disposed with respect to the intake port pipes 17a–17d along the side of the apparatus 10. The common manifold 24 communicates the incoming gas to a cylindrical, fluid collection tank 26, sometimes referred to in the art as a "demister" tank, via a short connecting pipe 28, which connects the center of the common manifold 24 to the top of the fluid collection tank 26. Connecting the short connecting pipe 28 at the center of the common manifold helps to insure uniform vacuum generation at all of the intake ports 14a–14d.

The fluid collection tank 26 serves to demist, or collect, soil moisture entrained in the incoming vapor stream supplied by the common manifold 24. In the preferred embodiment, the fluid collection tank 26 is a steel tank having four tank support feet $29a \geq 29d$ mounted to the transportable support frame 12 via two cross bars 31, 33, as shown in FIGS. 1 and 2. The fluid collection tank 26 has a capacity of 60 gallons and is an ASME pressure vessel. The fluid collection tank 26 is manufactured by and is commercially available from Manchester Tank, Inc., Lubbock, Tex., U.S.A.

A blower means 32 is situated near the top of the transportable support frame 12 for the purpose of drawing gas into the intake ports 14a–14d by forcing gas out of the fluid collection tank 26 and out of an exhaust port 34. The blower means 32 comprises a blower 36 driven by a motor 38. The blower sucks gas out of the fluid collection tank 26 via a vertical riser pipe 42 rising from the fluid collection tank 26 to a particulate filter 44 which is connected to the blower 36. The particulate filter 44 aids in removing solid particulate materials suspended in the gas to safeguard the functionality of the blower 36. The particulate filter 44 is manufactured by and is commercially available from Solberg Manufacturing Inc., Itasca, Ill., U.S.A. Gas from the particulate filter 44 travels through the blower 36 and out of the exhaust port 34.

Preferably, the blower 36 is a multistage centrifugal vacuum source, which is less susceptible to contamination and damage as compared to a positive displacement vacuum source. However, a typical multistage centrifugal vacuum source is generally more expensive than a typical positive displacement vacuum source and also is more limited in pressure range. Therefore, if cost and/or pressure range are important considerations, then a positive displacement vacuum source may be more desirable in the apparatus 10. It should be understood that virtually any kind of conventional vacuum source could be employed in the vapor recovery apparatus 10. The motor 38 can range from about 3 to 50 horsepower, and is preferably a three-phase 10 horsepower motor. The motor 38 and the blower 36 are commercially available as a combination set as a model 255 blower arrangement from the Lamson Corporation, Syracuse, N.Y., U.S.A.

The exhaust port 34 may be equipped with a cam and groove quick-connect coupling 45 to permit fast and easy coupling of the exhaust port 34 with an exhaust channeling system and/or an exhaust treatment system. The exhaust channeling system may, for example, be merely an elbow connected to an extension riser pipe for emitting exhaust into the atmosphere far above the apparatus 10. The exhaust treatment system may include, for instance, a catalytic converter mechanism, an incineration system, a biological treatment system, carbon filters, or the like.

As further shown in FIG. 1, a control unit 46 is disposed at the front side of the transportable support frame 12 for controlling the operation of the vapor recovery apparatus 10. In the preferred embodiment, the control unit is a modified 10 horsepower motor starter model 509-CUH manufactured by and commercially available from Allen Bradley, Inc., Milwaukee, Wis., U.S.A. The foregoing commercially available motor starter is enhanced by installing switching circuitry for turning the blower means 32 either on or off, depending upon the fluid level in the fluid collection tank 26, as will be discussed in further detail hereinafter.

The fluid collection tank 26 has an internal high float sensor (not shown) and an internal low float sensor (not shown) so as to indicate to the control mechanism 46 when the fluid level in the fluid collection tank 26 has reached respectively a predetermined high level and a predetermined low level. In the preferred embodiment, the high and low float sensors are conventional model AT4576 sensors manufactured by and commercially available from Gems Sensors, Inc., U.S.A. The sensors communicate electrical signals indicating fluid levels in the fluid collection tank 26 via an electrical cable 48, as shown in FIG. 1. The control mechanism 46 can be configured to turn off the blower means 32 when the fluid level in the fluid collection tank 26 has reached the predetermined high level. Drainage of the fluid collection tank 26 can then take place. Finally, once the fluid level in the fluid collection tank 26 has reached the predetermined low level, the control mechanism 46 can reinitiate operation of the blower means 32. The switching circuitry for implementing the foregoing process is well known in the art.

The fluid collection tank 26 can be drained via a tank faucet 52 disposed to drain fluid from the bottom of the fluid collection tank 26 and controlled by a gate valve 53. The fluid collection tank 26 may be drained by gravity force through a one-way check valve 55. Alternatively, a pumping mechanism (not shown) may be implemented to pump fluid from the tank faucet 52 to a reservoir where the fluid is disposed of or where further treatment of the fluid may take place. If a pumping mechanism is implemented, it is preferably controlled by the control mechanism 46. In this configuration, the control mechanism 46 can commence pumping operations in the pumping mechanism upon sensing the predetermined high level of fluid in the fluid collection tank 26. After the fluid level in the fluid collection tank 26 has reached the predetermined low level, the control mechanism 46 can then terminate operation of the pumping mechanism. It should be understood that the pumping mechanism can also be conveniently mounted, if desired, on the transportable support frame 12 adjacent the fluid collection tank 26 near the frame base.

In accordance with a significant safety feature of the present invention, the fluid collection tank 26 comprises a redundant level sensing mechanism 54 for detecting the predetermined high level of fluid in the tank 26. In the preferred embodiment, the redundant level sensing mechanism 54 comprises a loop-like pipe network connecting the bottom of the fluid collection tank 26 with the top of the fluid collection tank 26. The pipe network has a sight glass 56 situated in the front of the vapor recovery apparatus 10 for viewing the fluid level within the fluid collection tank 26. A float switch 58 is disposed in the pipe network of the redundant level sensing mechanism 54 for the purpose of detecting the predetermined high level of fluid and for sending electrical signals to the control mechanism 46 via an electrical control cable 62. Preferably, a model L6 explosion-proof float level switch is utilized, which is manufactured by and commercially available from Dwyer Instruments, Inc., Division WE Anderson, Michigan City, Ind., U.S.A.

In accordance with another significant feature of the present invention, a means is provided for regulating the total vacuum suction as well as pollution exhaust so as to accommodate federal, state, and local environmental regulations during the vacuum withdrawal process. More specifically, an ambient air port 64 controlled by an ambient air gate valve 66 is disposed to permit a user to selectively introduce an amount of ambient air into the gas traveling out of the fluid collection tank 26 so that the vaporized materials are diluted when the gas is expelled via the exhaust port 34. In essence, the ambient air port 64 serves the purpose of diluting the vaporized materials leaving the exhaust port 34 so as to bring the level of emitted pollution within federal, state, and local environmental regulations.

The ambient air port 64 further serves the purpose of regulating the total vacuum suction of the vapor recovery apparatus 10. In the preferred embodiment of the apparatus 10, the total vacuum suction is approximately 122 inches (of water), and this suction can be throttled from 0% to 100% of this total vacuum suction via the ambient air gate valve 66. The total vacuum pressure generated by the blower means 32 may be monitored by a vacuum gauge 68 disposed upstream from the ambient air port 64 and fluid collection tank 26.

A sample port 72, similar to the sample ports 16a-16d, is disposed adjacent the vacuum gauge 68 for sampling the total vapor materials from the entire plurality of intake ports 14a-14d. A vacuum relief valve 74 is situated between the particulate filter 44 and the blower intake 75 of blower 36 for introducing ambient air into the vacuum system if a substantial hazardous vacuum is generated therein. Such a hazardous condition could arise, for example, if the particulate filter 44 gets clogged.

For monitoring the pollution emissions exiting the exhaust port 34, the vapor recovery apparatus 10 is provided with a flow meter 76 and a temperature gauge 78. The flow meter 76 and the temperature gauge 78 can be of any conventional design. In the preferred embodiment, the flow meter 76 measures 40.180 standard cubic feet per minute (CFM). It is manufactured by and commercially available from Aquamatic, Inc., Rockford, Ill., U.S.A. Further, the temperature gauge 78 measures temperature in the range of approximately 0.200 degrees Fahrenheit. It is manufactured by and commercially available from Tel-Tru, Inc., Rochester, N.Y., U.S.A.

Furthermore, the vapor recovery apparatus 10 may be supported or mounted within a protection apparatus, such as a shed, a fenced area, or the like. In the preferred embodiment, the vapor recovery apparatus 10 is mounted in a trailer unit 82 having a hitching mechanism 83 and wheels 85, as shown in FIG. 3 and described hereinafter.

Figure 3:
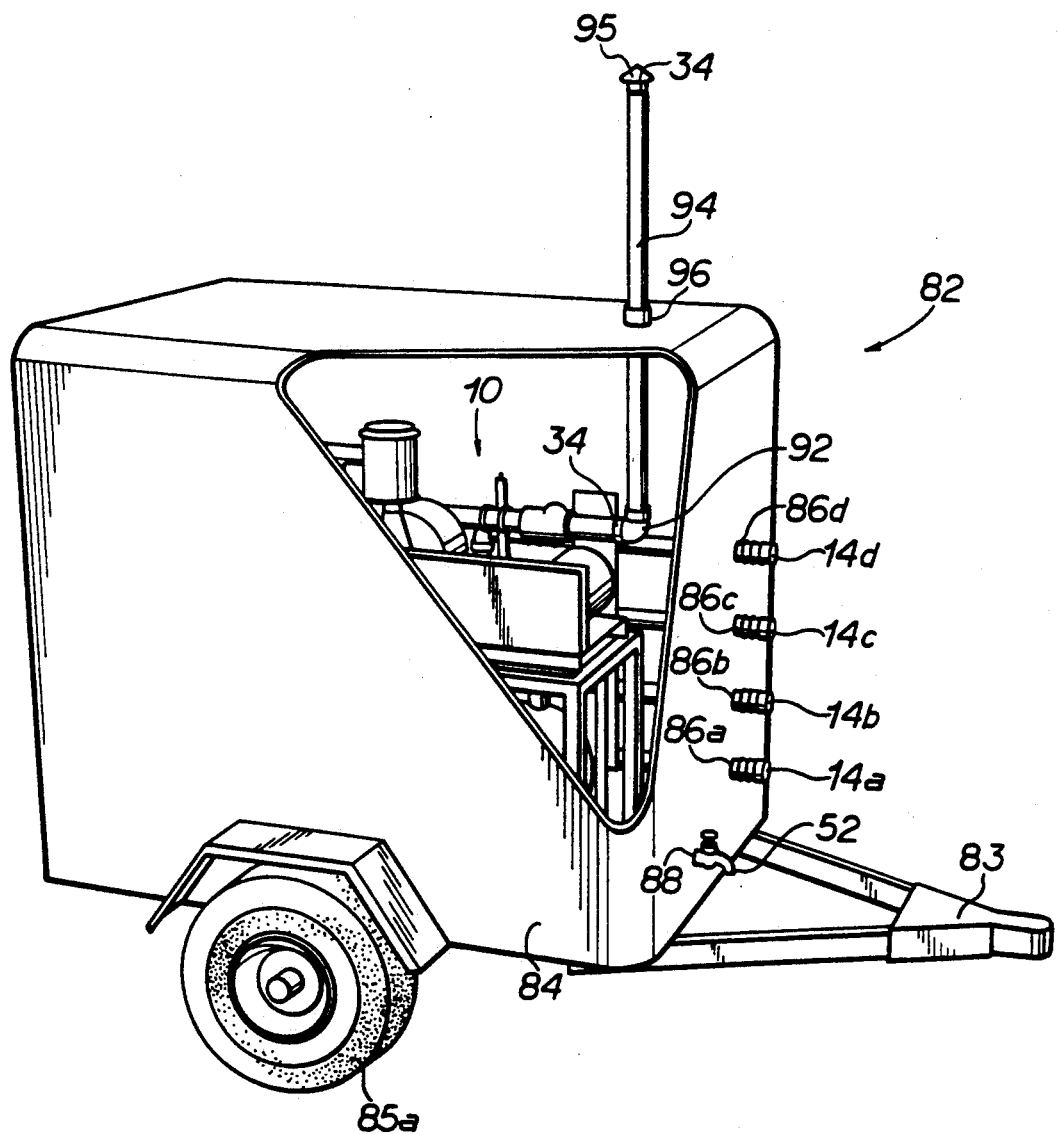
FIG. 3 is a partially cut-away side perspective view of a trailer unit for housing and transporting the mobile vapor recovery apparatus of FIG. 1.

With reference to FIG. 3, the vapor recovery apparatus 10 is situated within the trailer housing 84 of the trailer unit 82 so that the plurality of intake ports 14a-14d protrude outwardly through respective apertures 86a-86d in the front of the trailer housing 84. The tank faucet 52 also protrudes outwardly from the front of the trailer housing 84 through an aperture 88, as further shown in FIG. 3. In the preferred embodiment, conventional bulkhead fittings are employed to secure and pass the intake ports 14a-14d and tank faucet 52 through the trailer front wall.

Preferably, a pipe elbow 92 is disposed at the exhaust port 34 so as to connect the exhaust port 34 to a vertical riser pipe 94 protruding outwardly through the top of the trailer housing 84 through an aperture 96. At the top end of the vertical riser pipe 94 is an elevated exhaust port 34' where gases are emitted into the atmosphere far above the top surface of the trailer unit 82. A rain cap 95 may also be positioned at the top of the vertical riser pipe 94 over the elevated exhaust port 34' to prevent rain from entering the apparatus 10.

Figure 4:
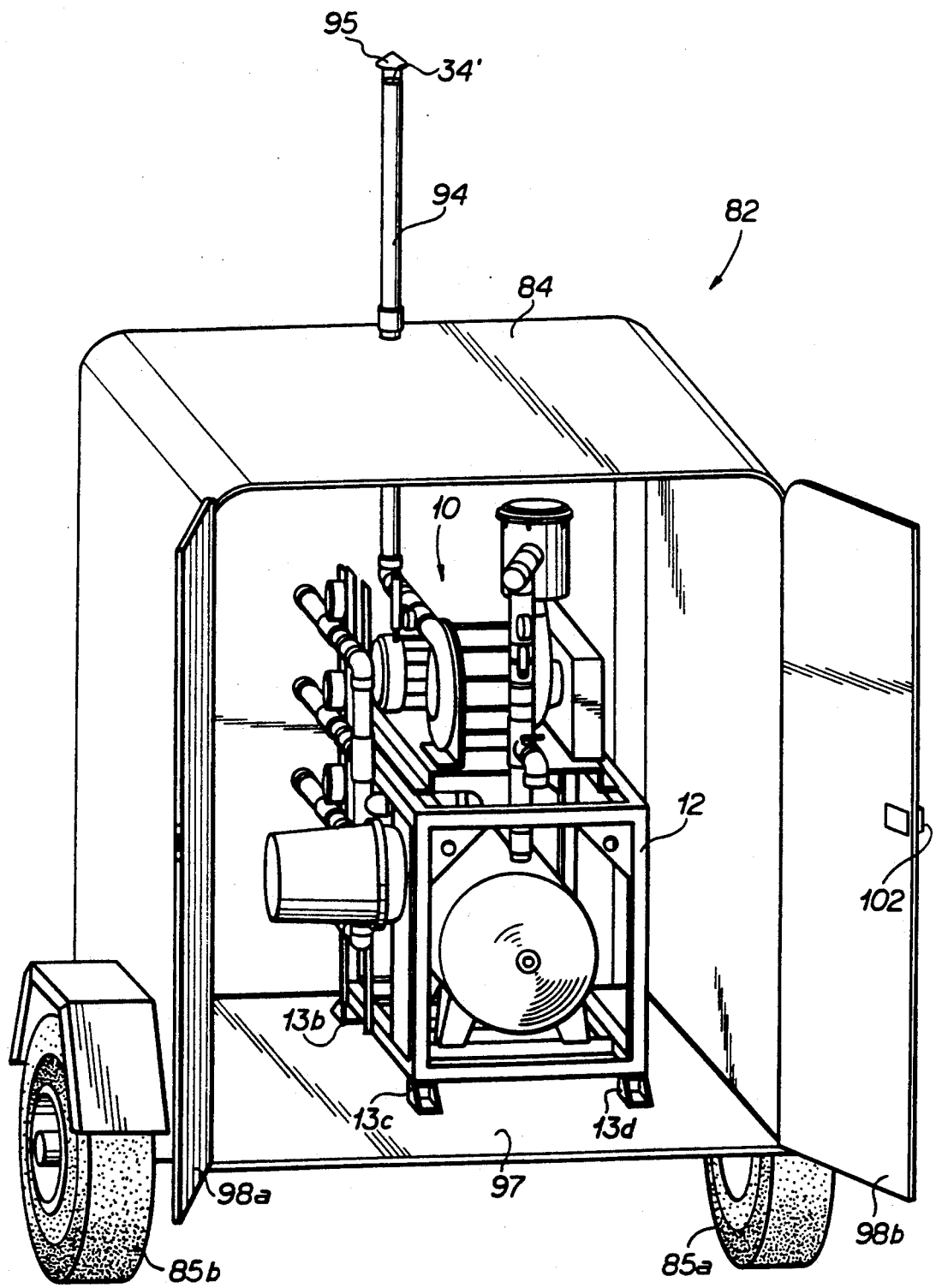
FIG. 4 is a rear perspective view of the trailer unit of FIG. 3 showing the internal placement of the mobile vapor recovery apparatus of FIG. 1 within the trailer unit.

A rear perspective view of the trailer unit 82 is illustrated in FIG. 4. As shown in FIG. 4, the vapor recovery apparatus 10 may be mounted to the floor 97 of the trailer unit 82 via the support frame feet 13a-13d and appropriate affixing means, such as bolts. The apparatus 10 may be mounted offset from rear center to permit access to the front controls of the apparatus 10, as illustrated in FIG. 4. Moreover, the housing 84 of the trailer unit 82 may comprise two doors 98a, 98b for permitting access to the vapor recovery apparatus 10 within the trailer housing 84. For security, the doors 98a, 98b may be locked with a locking mechanism 102. In conclusion, among many other advantages, the trailer unit 82 enhances the durability of the vapor recovery apparatus 10, permits easy transportation of the vapor recovery apparatus 10, and further protects the vapor recovery apparatus 10 from vandalism, theft, and unauthorized tampering.

It will be obvious to those skilled in the art that many modifications and variations may be made to the preferred embodiment described above without departing from the novel teachings of the present invention. All such modifications and variations ar intended to be incorporated herein and within the scope of the following claims.

Wherefore, the following is claimed by the inventors:

1. A mobile vapor recovery apparatus for efficiently removing materials from soil, comprising:
    an intake port means for releasably connecting to and receiving gas from a well pipe leading to a well in said soil, said gas having vaporized materials from said soil;
    a fluid collection tank configured to receive said gas from said intake port means, said tank for collecting fluid entrained in said gas;
    a blower means for drawing said gas into said intake port means by forcing said gas from said tank and out of an exhaust port; and
    a transportable support frame securing said intake port means, said fluid collection tank, and said blower means in a self-contained unit.

2. The apparatus of claim 1, further comprising an ambient air valve for introducing ambient air into the gas in said tank so that said vaporized materials are diluted when said gas is expelled via said exhaust port.

3. The apparatus of claim 1, further comprising a sample port in said intake port means for permitting extraction of a small quantity sample of said gas drawn within said intake port means.

4. The apparatus of claim 1, wherein said gas comprises radon gas.

5. The apparatus of claim 1, wherein said gas comprises hydrocarbons.

6. The apparatus of claim 1, further comprising a flowmeter disposed to measure the flow rate of said gas expelled out of said exhaust port.

7. The apparatus of claim 1, further comprising a temperature gauge disposed to measure the temperature of said gas expelled out of said exhaust port.

8. The apparatus of claim 1, further comprising a valve for regulating the flow rate of said gas entering said intake port means.

9. The apparatus of claim 1, wherein said intake port means comprises a quick-connect means for quickly connecting and disconnecting said apparatus and said soil.

10. The apparatus of claim 1, further comprising control means for preventing said blower means from drawing said gas when said fluid collection tank comprises a predetermined high level of said fluid.

11. The apparatus of claim 10, further comprising a drainage means for removing an amount of said fluid from said tank.

12. The apparatus of claim 10, further comprising at least two level sensing means for detecting said predetermined high level of said fluid in said tank, said level sensing means communicating with said control means.

13. The apparatus of claim 11, wherein said control means, after preventing said blower means from drawing said gas, permits said blower means to again draw gas when said fluid collection tank comprises a predetermined low level of said fluid.

14. The apparatus of claim 11, further comprising a pump for removing said fluid from said tank, said pump being controlled by said control means.

15. A mobile vapor recovery apparatus for efficiently removing materials from soil, comprising:
a plurality of intake ports each configured to releasably connect to a well pipe means communicating gas having vaporized materials from a well in said soil, said intake ports communicating said gas to a common manifold;
a fluid collection tank configured to receive said gas from said manifold, said tank for collecting fluid entrained in said gas;
a blower means for drawing said gas into said intake ports by forcing said gas from said tank and out of an exhaust port; and
a transportable support frame securing said plurality of intake ports, said fluid collection tank, and said blower means in a self-contained transportable unit.

16. The apparatus of claim 15, further comprising an ambient air valve for introducing ambient air into the gas in said tank so that said vaporized materials are diluted when said gas is expelled via said exhaust port.

17. The apparatus of claim 15, further comprising a sample port corresponding with each of said intake ports, said sample ports configured to permit extraction of small quantity samples of said gas drawn within each of said intake ports.

18. The apparatus of claim 15, wherein said gas comprises radon gas.

19. The apparatus of claim 15, wherein said gas comprises hydrocarbons.

20. The apparatus of claim 15, further comprising control means for preventing said blower means from drawing said gas when said fluid collection tank comprises a predetermined high level of said fluid.

21. The apparatus of claim 15, further comprising a flowmeter disposed to measure the flow rate of said gas expelled out of said exhaust port.

22. The apparatus of claim 15, further comprising a temperature gauge disposed to measure the temperature of said gas expelled out of said exhaust port.

23. The apparatus of claim 15, further comprising a valve corresponding exclusively with each of said intake ports, said valve for regulating the flow rate of said gas entering the corresponding intake port.

24. The apparatus of claim 15, wherein said intake ports further comprise quick-connect means for quickly connecting and disconnecting said apparatus and said soil.

25. The apparatus of claim 20, further comprising at least two level sensing means for detecting said predetermined high level of said fluid in said tank, said level sensing means communicating with said control means.

26. The apparatus of claim 20, further comprising drainage means for removing an amount of said fluid from said tank.

27. The apparatus of claim 26, wherein said control means, after preventing said blower means from drawing said gas, permits said blower means to again draw gas when said fluid collection tank comprises a predetermined low level of said fluid.

28. The apparatus of claim 26, further comprising a pump for removing said fluid from said tank, said pump being controlled by said control means.

29. A method for easily and efficiently removing materials from soil, comprising the steps of:
securing an intake port means, a fluid collection tank, and a blower means to a transportable support frame to derive a self-contained unit;
disposing quick-connect means on said intake port means for releasably connecting and disconnecting said intake port means of said unit and a well pipe means for communicating gas having vaporized materials from a well in said soil;
configuring said fluid collection tank to receive gas from said intake port means, said tank for collecting fluid entrained in said gas; and
disposing said blower means to draw said gas into said intake port means by forcing said gas from said tank and out of an exhaust port.

* * * * *